United States Patent [19]

Tatukawa et al.

[11] Patent Number: 4,701,654
[45] Date of Patent: Oct. 20, 1987

[54] ROTOR STRUCTURE OF MAGNETO GENERATOR

[75] Inventors: Juniti Tatukawa, Okazaki; Shozo Kirihara, Kariya, both of Japan

[73] Assignee: Nippondenso Co., Ltd., Kariya, Japan

[21] Appl. No.: 871,119

[22] Filed: Jun. 5, 1986

[30] Foreign Application Priority Data

Jun. 6, 1985 [JP] Japan ................. 60-123454
Dec. 12, 1985 [JP] Japan ................. 60-280023
Dec. 16, 1985 [JP] Japan ................. 60-282235

[51] Int. Cl.$^4$ ................. H02K 15/02; H02K 15/14
[52] U.S. Cl. ................. 310/153; 310/42; 310/67 R
[58] Field of Search ................. 310/42, 67 R, 89, 91, 310/153, 154, 156, 268

[56] References Cited

U.S. PATENT DOCUMENTS 3,368,275  2/1968  Eberline et al. ................. 310/154
4,433,473  2/1984  Benedetti ................. 310/153

FOREIGN PATENT DOCUMENTS 153258  11/1980  Japan ................. 310/154
59-23180  5/1984  Japan .
216455  12/1984  Japan ................. 310/153

OTHER PUBLICATIONS

Journal of Nippondenso Technical Disclosure, No. 30-39, published Apr. 20, 1983.

Primary Examiner—Peter S. Wong
Assistant Examiner—D. L. Rebsch
Attorney, Agent, or Firm—Cushman, Darby & Cushman

[57] ABSTRACT

A magneto rotor has a cup-shaped iron casing accommodating magnets disposed along and in contact with the inner peripheral surface of the casing. The magnets form a circumferentially discontinuous but generally circular annulus into which a generally annular magnet retainer member is forced through the open end of the casing to radially outwardly urge the magnets into face-to-face engagement with the casing inner peripheral surface, to retain the magnets in position therein. The magnet retainer member has an axially inner fixing section fixed to the casing bottom wall and ridges radially outwardly projecting from a cylindrical section of the retainer member into spaces between the magnets. When the magnet retainer member is forced into the annulus of magnets, the cylindrical section is radially outwardly deformed at the ridges.

15 Claims, 14 Drawing Figures

ROTOR STRUCTURE OF MAGNETO GENERATOR

FIELD OF THE INVENTION

The present invention relates to a rotor of a magneto driven, for example, by an internal combustion engine.

DESCRIPTION OF THE PRIOR ART

JOURNAL OF NIPPONDENSO TECHNICAL DISCLOSURE, No. 30-39, published Apr. 20, 1983, discloses a magneto rotor having a plurality of magnets arranged along an inner peripheral surface of an iron casing to form an annulus of magnets. An annular magnet retainer member has a cylindrical section forced through an open end of the casing into the annulus of magnets to radially outwardly urge them against the casing inner peripheral surface. The magnet retainer member further includes an axially inner fixing section secured to a closed bottom wall of the casing and a flange section extending radially outwardly from the axially outer end of the cylindrical section in face-to-face engagement with the axially outer end face of the anulus of magnets to hold them against axially outward movement from the casing. The prior art rotor referred to above will be called hereunder as "first prior art rotor".

Japanese Patent Publication No. 59-23180 (23180/84) published May 31, 1984 discloses a second prior art magneto rotor having a plurality of arcuate magnets disposed along a cylindrical inner peripheral surface of a casing in circumferentially spaced relationship. A substantially cylindrical magnet retainer member is disposed to hold the magnets on the casing inner peripheral surface. The magnet retainer member has protrusions projecting radially outwardly from the outer cylindrical surface of the magnet retainer member into the spaces between the magnets. A magnet holding plate is disposed in face-to-face contacting relationship to the axially outer end faces of the magnets. The axially outer end face of the casing is deformed along the peripheral edge of the opening to axially inwardly urge the magnet holding plate to thereby retain the magnets and the magnet retainer member in position in the casing.

In the first prior art rotor, the magnets are intended to be held in position solely by the radially outward force exerted by the cylindrical section of the magnet retainer member. The radially outward force, however, is insufficient to hold the magnets against movement in the circumferential direction of the casing. Thus, it is required to use an adhesive to strongly secure the magnets to the casing, which greatly lowers the productivity.

In the second prior art rotor, the cylindrical magnet retainer member is formed by bending a sheet of resilient sheet metal into a hollow cylindrical form. The radially outwardly projecting protrusions must be formed by deforming the cylindrically shaped sheet metal radially outwardly at portions radially aligned with the spaces between the magnets, with a result that the steps of manufacture of the rotor are complicated. In addition, because the magnet holding plate is incorporated in the rotor and must be urged against the axially outer end faces of the magnets by deforming the inner peripheral edge of the axially outer end face of the casing, the rotor needs an increased number of component parts and an increased number of steps of manufacture.

SUMMARY OF THE INVENTION

The present invention has its object to provide an improved magneto rotor in which a small number of component parts are required to strongly and easily secure magnets to the inner peripheral surface of a casing.

The magneto rotor according to the present invention includes a generally cup-shaped casing having a peripheral wall open at one end and closed at the other end by a bottom wall. A plurality of magnets are disposed along an inner peripheral surface of the casing in mutually circumfernetially spaced relationship with each other. The magnets are arranged to form a circumferentially discontinuous annulus having substantially cylindrical but circumferentially discontinuous inner peripheral surface having an open end communicated with and being substantially coaxial with the open end of the casing. A magnet retainer member includes a substantially cylindrical section extending in face-to-face pressure-contact with the inner peripheral surface of the annulus of magnets a fixing section integral with the axially inner end of the cylindrical section and extending along and secured to the casing bottom wall. The annulus of magnets has a circumferentially discontinuous but generally annular axially outer end face. The magnet retainer member further includes a flange section connected to the axially outer end of the cylindrical section and extends along the axially outer end face of the annulus of magnets in face-to-face engagement therewith to retain the magnets against axially outward removal from the casing. The magnet retainer member is formed from a thin sheet metal. The cylindrical section has an initial outer diameter before the magnet retainer member is forced into the annulus of magnets. The initial outer diameter is greater than the inner diameter of the annulus of magnets. The cylindrical section is provided thereon with radially outwardly deformed ridges radially aligned with and radially outwardly extending into the spaces between the magnets, respectively.

When the cylindrical section of the magnet retainer member is urged into the annulus of magnets disposed in contact with the inner peripheral surface of the casing, the cylindrical section is deformed at or around the ridges radially outwardly into the spaces between the magnets to take up the difference between the initial outer diameter of the cylindrical section and the inner diameter of the annulus of magnets whereby the cylindrical section radially outwardly urges the magnets against the casing inner peripheral surface and the radially outwardly deformed portions of the cylindrical section hold the magnets against movement in the circumferential direction of the casing.

The above and other objects, features and advantages of the present invention will be made more apparent by the following description with reference to the accompanying drawings.

DESCRIPTION OF PREFERRED EMBODIMENTS

Referring to FIGS. 1 to 4, a casing 1 of iron is generally cup-shaped and has a cylindrical peripheral wall 1a and an integral closed bottom wall 1b. The peripheral wall 1a has an inner peripheral surface which is so changed as to provide an annular shoulder 1c adjacent to the bottom wall 1b, as will best be seen in FIG. 2. Four narrow projections 1d are formed on the annular shoulder 1c and disposed at substantially circumferentially equal intervals. The projections 1d and the annular shoulder 1c are formed simultaneously with the cylindrical peripheral wall 1a and the bottom wall 1b when the casing 1 is shaped by drawing a sheet of iron. The bottom wall 1b of the casing 1 is formed therein with four rivet holes (one of which is shown as at 1e in FIG. 2) disposed in radially aligned relationship with the projections 1d, respectively. The rivet holes 1e are arranged on a circle about the axis of the casing 1. Four centering holes (one of which is shown as at 1f in FIG. 2) are also formed in the bottom wall 1b of the casing 1 and disposed radially outwardly of the rivet holes 1e and also arranged on a circle about the axis of the casing 1. The centering holes 1f are positioned relative to the rivet holes 1e such that each centering hole 1f is substantially angularly centered between each circumferential pair of the rivet holes 1e. Four pairs of studs 1g project from the inner surface of the bottom wall 1b of the casing 1 and are arranged such that the studs 1g of each pair are disposed on the circumferentially opposite sides of each of the centering holes 1f.

Figure 1:
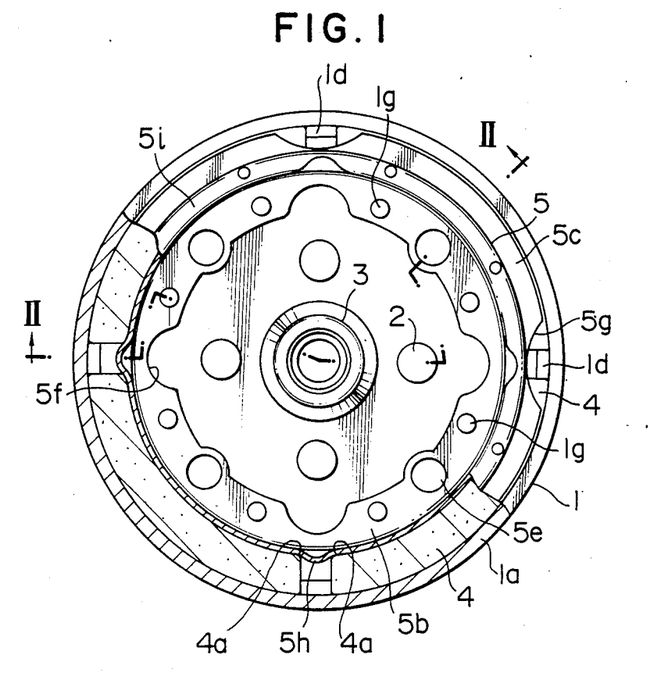
FIG. 1 is a partly sectional top plan view of a first embodiment of the rotor of a magneto according to the present invention.
Figure 2:
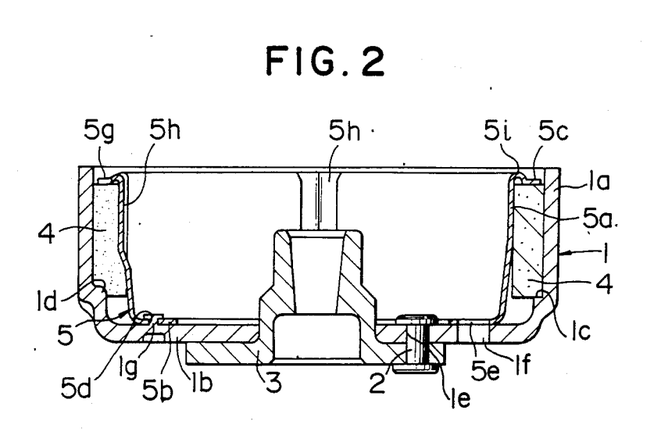
FIG. 2 is a sectional view of the rotor taken along line II—II in FIG. 1.

A hub 3 is secured to the bottom wall 1b of the casing 1 by rivets 2 and extends axially into the space defined by the cylindrical peripheral wall 1a. The hub 3 is designed to be drivingly connected to a crank shaft of an internal combustion engine, not shown.

Four magnets 4 each having an arcuate cross-section are disposed on the inner peripheral surface of the cylindrical peripheral wall 1a of the casing 1 and substantially equally spaced circumferentially of the casing 1. The bottom ends of the magnets 4 are engaged with the annular shoulder 1c of the casing 1 to axially position the magnets relative to the casing, while the axially extending side faces of respective magnets are engaged by the projections 1d on the annular shoulder 1c to position the magnets 4 circumferentially of the casing 1. Each magnet 4 has four rounded corners or apexes adjacent to the radially inner surface of the magnet, as well as four rounded corners or apexes adjacent to the radially outer surface of the magnet. The inner surfaces of the four magnets cooperate to define a circumferentially discontinuous but generally cylindrical inner peripheral surface into which an annular magnet retainer member 5, formed from a thin sheet of a non-magnetic material having a thickness of about 0.4 mm, is press-fitted or wedged to urge the four magnets 4 against the inner peripheral surface of the peripheral wall 1a of the casing 1.

Figure 3:
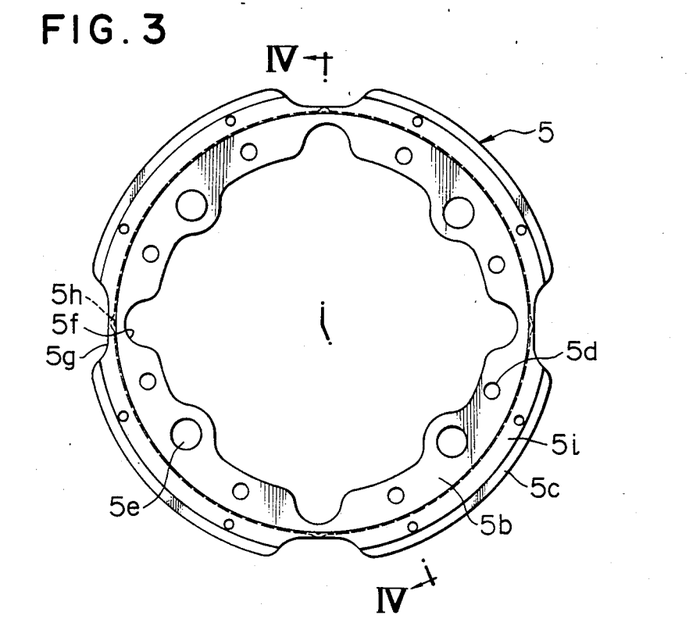
FIG. 3 is a front view of a magnet retainer member incorporated in the first embodiment shown in FIGS. 1 and 2.
Figure 4:
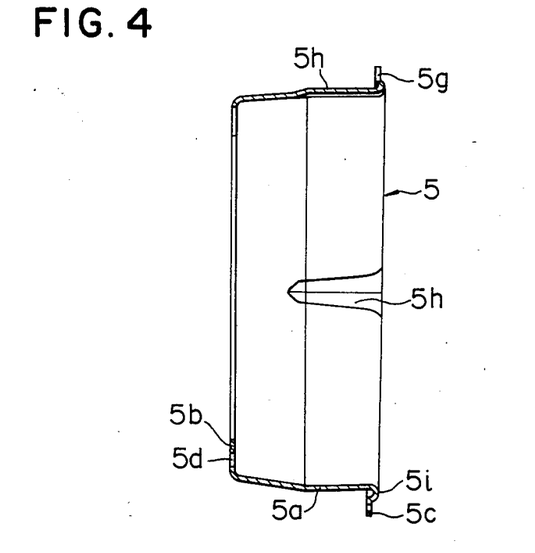
FIG. 4 is a sectional view of the magnet retainer member taken along line IV—IV in FIG. 3.
Figure 5:
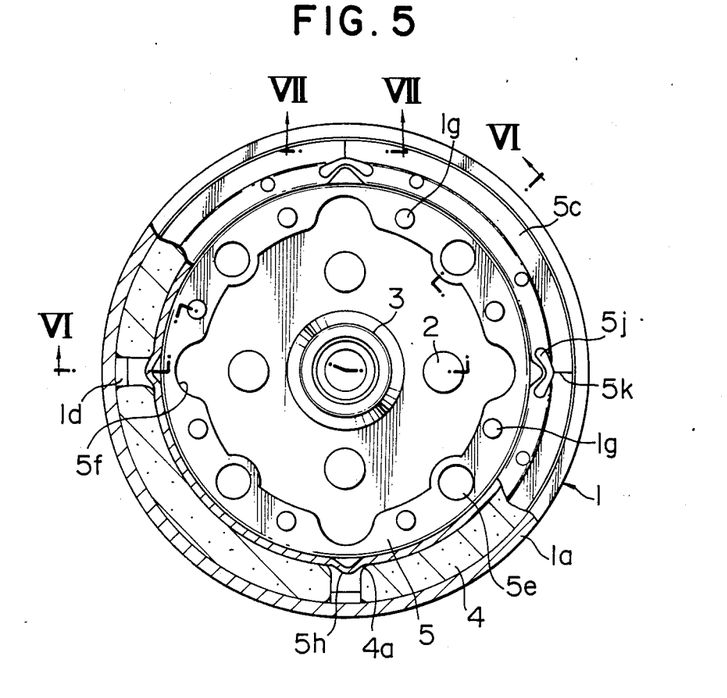
FIG. 5 is similar to FIG. 1 but illustrates a second embodiment of the rotor according to the present invention.
Figure 6:
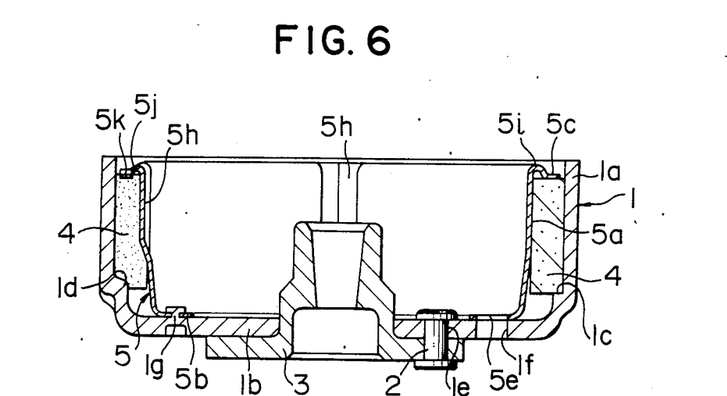
FIG. 6 is a sectional view of the second embodiment of the rotor taken along line VI—VI in FIG. 5.
Figure 7:
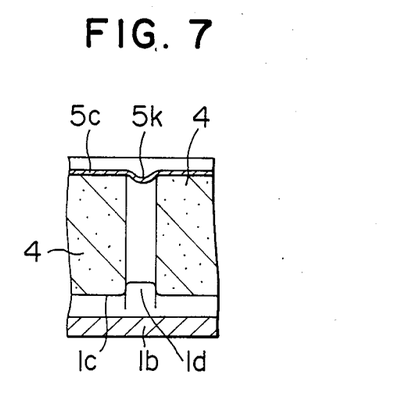
FIG. 7 is a fragmentary sectional view of the second embodiment of the rotor taken along line VII—VII in FIG. 5.
Figure 8:
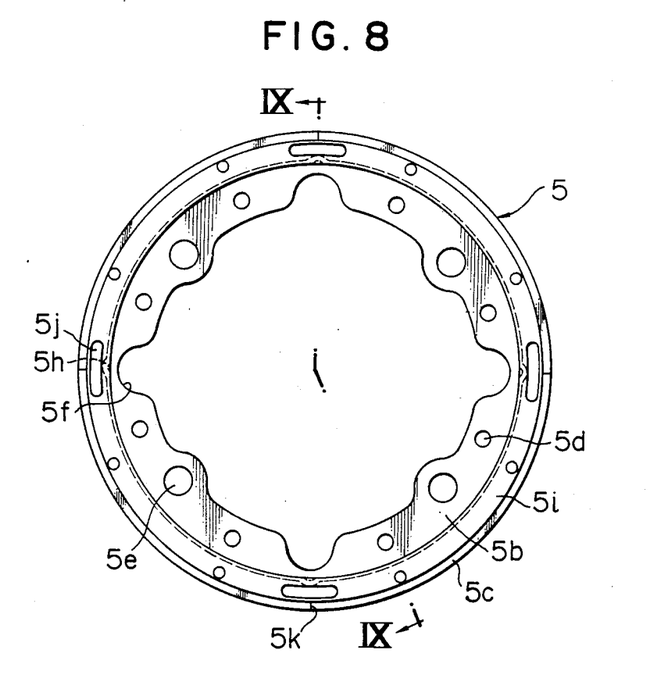
FIG. 8 is a front view of a magnet retainer member incorporated in the second embodiment of the rotor of the invention.
Figure 9:
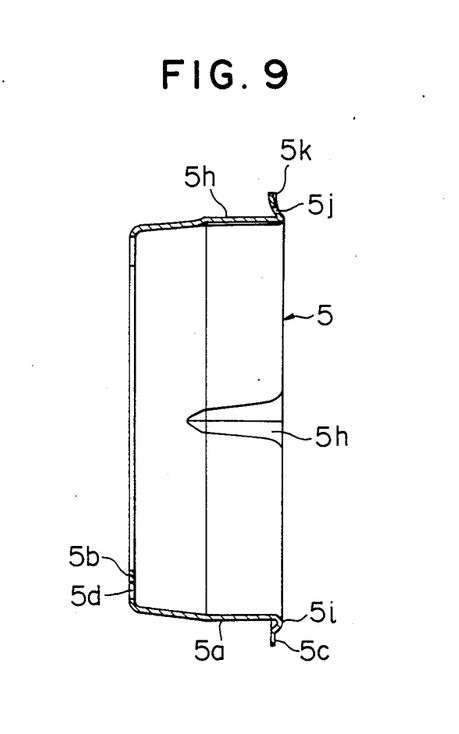
FIG. 9 is a section of the magnet retainer member shown in FIG. 8, taken along line IX—IX in FIG. 8.

More particularly, before the magnet retainer member 5 is press-fitted into the generally cylindrical inner peripheral surface defined by the radially inner surfaces of the four magnets 4, the member 5 has a shape shown in FIGS. 3 and 4; namely, the magnet retainer member 5 in free position has a substantially cylindrical section 5a having an outer diameter slightly greater than the inner diameter of the cylindrical inner peripheral surface of the circle or annulus formed by the four magnets 4, an annular fixing section 5b radially inwardly extending from one end of the cylindrical section 5a and an annular flange section 5c radially outwardly extending from the other end of the cylindrical section 5a. All sections 5a, 5b and 5c of the member 5 are integral and drawn from sheet metal. About a half of the axial length of the cylindrical section 5a, which is adjacent to the fixing section 5b, is tapered and gradually reduced to the said one end of the cylindrical section 5a so that said one end of the cylindrical section 5a has an outer diameter slightly smaller than the inner diameter of the annulus of the four magnets 4. The fixing section 5b of the magnet retainer member 5 is formed therein with eight stud holes 5d so disposed as to receive the studs 1g on the bottom wall 1b of the casing 1. Thus, the stud holes 5d each have an inner diameter slightly greater than the outer diameter of each stud 1g. The fixing section 5b is also formed therein with four centering holes 5e so positioned as to be aligned with the centering holes 1f in the bottom wall 1b of the casing 1, each centering hole 5e being of a diameter substantially the same as the diameter of each centering hole 1f. Moreover, four notches 5f are formed in the inner peripheral edge of the fixing section 5b and are so disposed as to be radially aligned with the spaces defined between the respective circumferentially adjacent pairs of the magnets 4.

Additional four notches 5g are formed in the outer peripheral edge of the flange section 5c of the magnet retainer member 5 and radially aligned with the four notches 5f, respectively. The cylindrical section 5a of the magnet retainer member 5 is radially outwardly deformed at four circumferentially equally spaced places to provide radially outwardly projecting ridges 5h to be received in the spaces between the magnets 4, respectively. Each ridge 5h extends axially along the outer peripheral surface of the cylindrical section 5a of the magnet retainer member 5 and is gradually narrowed toward the fixing section 5b. The flange section 5c is connected to the cylindrical section 5a by an annular reinforcement rib 5i which has a generally arcuate axial section having the ends of the arc integrally connected to the cylindrical and flange sections 5a and 5c of the magnet retainer member 5, respectively, as best shown in FIG. 4. The notches 5g extend radially inwardly from the outer peripheral edge of the flange section 5c to a part of the radial dimension of the rib 5i.

In the position of the magnet retainer member 5 shown in FIGS. 1 and 2, i.e., when the member 5 is assembled with the casing 1 and the magnets 4, the cylindrical section 5a is in face-to-face pressure-contact with the inner surfaces of the four magnets 4, while the fixing section 5b extends along the bottom wall 1b of the casing 1, the flange section 5c is placed in face-to-face pressure-contact with the annular end face of the open end of the casing 1, and the radially outwardly projecting ridges 5h are urged against those rounded corners 4a of the magnets which are disposed adjacent to the radially inner surfaces thereof.

The steps of assembling the component parts described above will be explained hereunder. A jig (not shown) is prepared which is provided with upstanding pins to be received in the centering holes 1f and 5e. Then, the casing 1, with its open end directed upwardly, is placed on the jig and the position of the casing relative to the jig is adjusted until the pins on the jig are received in the centering holes 1f in the casing bottom wall 1b.

Then, the four magnets 4 are placed on the annular shoulder 1c in contact with the inner peripheral surface of the cylindrical section 1a of the casing 1 and positioned in circumferentially equally spaced relationship by means of the projections 1d. Thereafter, the reduced end portion of the magnet retainer member 5 is inserted into a generally cylindrical recess formed radially inwardly of the circularly arranged four magnets 4, with the centering holes 5e in the member 5 aligned with the centering pins on the jig. The magnet retainer member 5 is forced downwardly until the fixing section 5b of the member 5 is engaged by the bottom wall 1b of the casing 1 and the centering pins on the jig are received in the centering holes 5b in the member 5. It is to be understood that, because the cylindrical section 5a of the member 5 has an outer diameter slightly greater than the inner diameter of the circle of the four mangets 4, the cylindrical section 5a of the member 5 receives a force which tends to reduce the cylindrical section 5a of the member 5 when it is forced down into the circle of the four magnets 4. The force produces stress in the cylindrical section, which stress is concentrated in the radially outwardly deformed ridges 5h which are most easily deformable parts of the cylindrical section 5a. When the magnet retainer member 5 is pressed into the circle of the magnets 4, the radially projecting ridges 5h of the member 5 are further deformed into the spaces between the four magnets 4. It will also be appreciated that, because the notches 5g are formed in the flange section 5c and the reinforcement rib 5i and aligned with the ridges 5h, and thus with the spaces between the magnets 4, respectively, the deformation of the magnet retainer member 5 at or around the ridges 5h can be more facilitated than in a case where the reinforcement rib 5i is not notched but extends circumferentially completely. Moreover, the rounded corners 4a of the magnets 4 adjacent to the radially inner surfaces of the magnets 4 do not block the outward movements of the material of the member 5 adjacent to the radially outwardly projecting ridges 5h when the member 5 is deformed radially outwardly at or adjacent to the ridges 5h. Thus, the magnet retainer member 5 can be smoothly deformed into the spaces between the circumferentially spaced four magnets 4.

When the fixing section 5b of the magnet retainer member 5 is engaged by the bottom wall 1b of the casing 1 with the centering pins on the jig received in the centering holes 5e in the fixing section 5b of the member 5, the studs 1g on the bottom wall 1b of the casing 1 are received in and extend through the stud holes 5d in the fixing section 5b. Thus, by forcibly deforming the top portions of the studs 1g against the fixing section 5b around the stud holes 1g, the magnet retainer member 5 can be rigidly secured to the bottom wall 1b of the casing 1, as shown in FIG. 2. In this position of the member 5, the flange section 5c is urged against the axially outer end faces of the magnets 4 adjacent to the open end of the casing 1, as will also be seen in FIG. 2.

The tolerances of the respective component parts are taken up by the outward deformation of the magnet retainer member 5 at or around the radially projecting ridges 5h. However, because the outer diameter of the reduced portion of the cylindrical section 5a of the member 5 adjacent to the fixing section 5b is determined to be less than the inner diameter of the circle of the four magnets arranged circularly on the inner peripheral surface of the cylindrical wall 1a of the casing 1, the fixing section 5b of the member 5 is deformed little when the member 5 is press-fitted into the circle of the magnets 4. Therefore, the fixing section 5b of the member 5 does not suffer from any changes from the initial condition, such as movements or offsets and distortions of the stud holes 5d which would otherwise be caused by the radially outer deformation of the casing 1 at or around the ridges 5h. Thus, the top portions of the studs 1g can surely be forcibly deformed into locking engagement with the bottom wall 1b of the casing 1 to strongly secure the magnet retainer member 5 to the casing 1. The magnets 4, therefore, are urged by the cylindrical section 5b of the member 5 into face-to-face pressure contact with the inner peripheral surface of the cylindrical wall 1a of the casing 1, so that the magnets 4 are fixed to the casing 1 against any axial and circumferential movements. In addition, because the fixing section 5b of the magnet retainer member 5 is positioned substantially centrally of the circle of the four magnets 4 by four circumferentially equally spaced points of the member 5, i.e., by the cooperation of the centering holes 5e in the fixing section 5b with the centering pins on the above-mentioned jig, and is urged in this state against the bottom wall 1b of the casing 1, the stud holes 5d in the fixing section 5b of the member 5 can be prevented from being deformed when the member 5 is forced into the circle of the magnets 4.

The magneto rotor of the described embodiment of the invention, therefore, requires the minimum number of component parts. The magnets 4 can be secured to the casing 1 without any adhesive and also can be protected by the magnet retainer member 5 with resultant improvement in the quality of the rotor, simplification of the steps of manufacture of the rotor and reduction in the cost of manufacture. Moreover, because no adhesive is used to secure the component parts together, the mechanical strength of the rotor is improved and the predetermined performance of the rotor is assured up to the Curie temperature of the magnets (about 350° C.).

FIGS. 5–9 show a second embodiment of the invention, wherein the same parts as those of the first embodiment are designated by the same reference numerals.

The magnet retainer member 5 before it is assembled with other component parts has its flange section 5c formed therein with circumferentially elongated slots 5j to be respectively radially aligned with the spaces between four circularly arranged magnets 5; namely, the notches 5g of the first embodiment are replaced by the slots 5j. In addition, the flange section 5c is formed therein with small recesses 5k disposed adjacent to the radially outer sides of the slots 5j, respectively.

In the second embodiment, therefore, the flange section 5c has circumferentially continuous outer peripheral edge to increase the mechanical strength of the magnet retainer member 5, as well as to increase the force of the flange section 5c to be exerted to the outer end faces of the magnets 4 when they are installed in position within the casing 1. The small recesses 5k formed in the flange section 5c are effective to prevent a tendency that the flange section 5c is radially outwardly expanded when the magnet retainer member 5 is pressed into the circle of four magnets 4 disposed in the casing 1; namely, the flange section 5c can be further deformed in or at the recesses 5k to take up the stress which otherwise would radially outwardly expand the flange section 5c when the member 5 is forcibly inserted into the circle of the four magnets.

Figure 10:
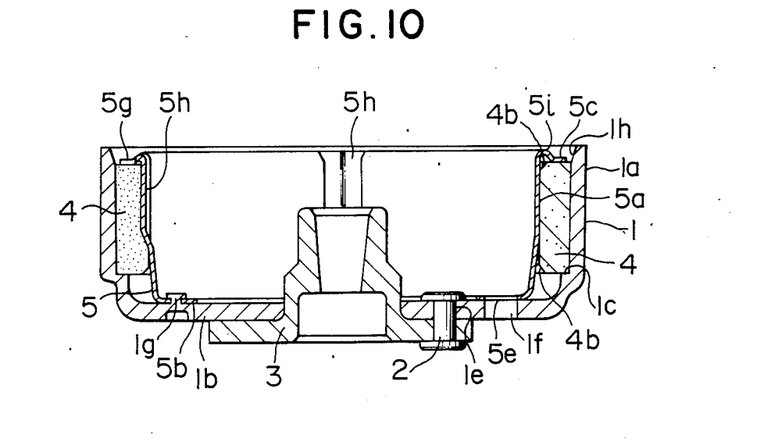
FIG. 10 is similar to FIGS. 2 and 6 but illustrates a third embodiment of the rotor of the invention.

A third embodiment of the invention is shown in FIG. 10 in which the same parts as those previously described are designated by the same reference numerals. The third embodiment is distinguished from the preceding embodiments in that the edges defined between the inner face of each of the magnets 4 and the axially inner and outer end faces thereof are bevelled as at 4b, and that the part of the inner peripheral surface of the casing 1 adjacent to the open end thereof is tapered as at 1h to diverge outwardly to the open end of the casing 1. The tapered part 1h and the annular shoulder 1c are simultaneously shaped when the casing is drawn from a sheet of iron. The tapered part 1h of the casing 1 is dimensioned such that the axially outer part of the radially outer surface of each magnet 4 extends upwardly beyond the transition point between the tapered part 1h of the inner surface of the casing 1 and the cylindrical part of the casing inner peripheral surface, so that a small gap is defined between the tapered parts 1h and the radially outer magnet surface.

The bevelled edge 4b adjacent to the axially outer end face of each magnet 4 assures that the magnet retainer member 5 can be smoothly forced into the circle of the four magnets 4 to prevent the said edge of the magnet from being damaged by the magnet retainer member, to thereby facilitate smooth radially outward deformation of the member 5 at or around the ridges 5h. The small gap between the tapered part 1h of the casing inner peripheral surface and the adjacent part of the radially outer magnet surface is effective to prevent concentration of stress in the radially outer and axially upper edge of each magnet which stress would otherwise occur when the magnet retainer member 5 is forced into the circle of the four magnets 4 circularly arranged in the casing 1, whereby the radially outer and axially upper edge of each magnet 4 can be prevented from being damaged when the member 5 is forced into the circle of the magnets 4. Moreover, the bevelled edges 4b are operative not only to prevent concentration of stress in the said edges but also to prevent the outer surface of the thin magnet retainer member 5 from being scratched by sharp edges of the magnets.

Figure 11:
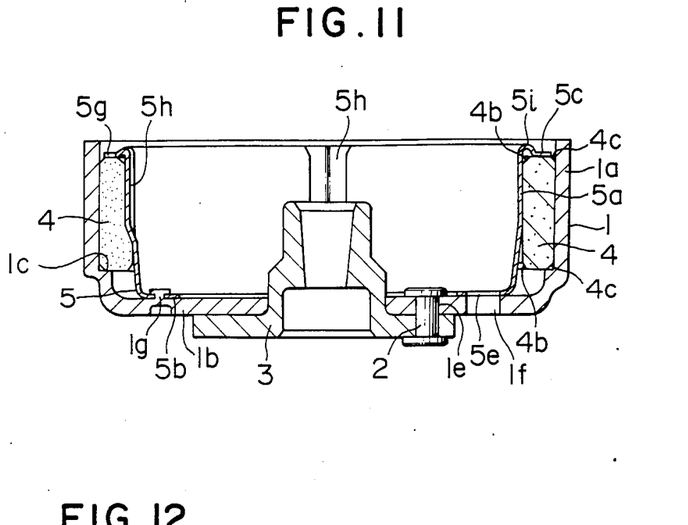
FIG. 11 is a similar view but illustrates a fourth embodiment of the rotor of the invention.

FIG. 11 shows a fourth embodiment of the invention which is substantially the same as the third embodiment shown in FIG. 10 with the exception that the upper part of the casing inner peripheral surface is not tapered but, instead, the edges of each magnet 4 defined between the radially outer surface and the axially inner and outer end surfaces thereof are bevelled as at 4c to provide an advantageous merit similar to that obtained from the third embodiment of the invention.

Figures 12, 13:
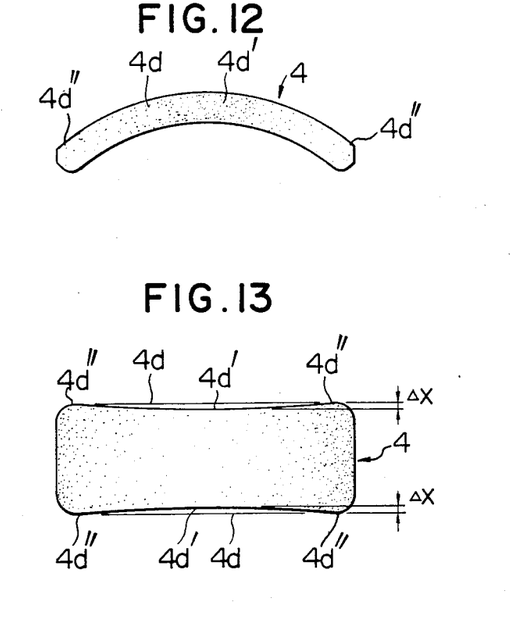
FIGS. 12 and 13 are top plan view and front elevation, respectively, of a magnet incorporated in a fifth embodiment of the rotor of the invention.
Figure 14:
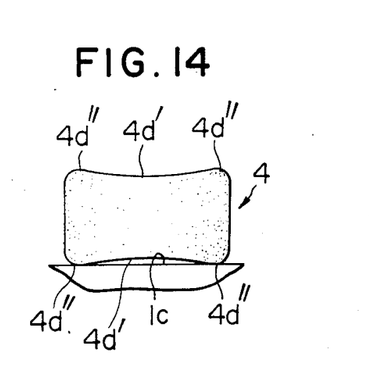
FIG. 14 is a schematic illustration of the position of the magnet of the fifth embodiment relative to a casing thereof.

A fifth embodiment is shown in FIGS. 12–14 and characterized in that the shapes of the magnets 4 are modified. As will be seen in FIG. 13 which is a front view of one of the magnets 4, the axially opposite end faces 4d of each magnet 4 each have a slightly recessed central zone 4d' which is axially inwardly offset a distance $\Delta X$ from the laterally outer end zones 4d'' of the magnet. Thus, when the magnets 4 are inserted into the casing 1 and disposed on the annular shoulder 1c thereof, only the laterally outer zones 4d'' of each magnet 4, namely, the circumferential end zones of each magnet when disposed in the casing 1, are engaged by the annular shoulder 1c of the casing 1 to assure that each magnet can correctly stand from the annular shoulder 1c and is prevented from being inclined relative to the axis of the casing 1. Therefore, when the magnet retainer member 5 is urged into the circle of the magnets 4 circularly arranged on the shoulder 1c, the force transmitted from the member 5 to each magnet 4 can be equally distributed to the laterally opposite end zones 4d'' of the magnet to prevent damage of the magnet which would otherwise occur due to concentration of stress in a localized point of the magnet.

In general, it is unavoidable that, even if it is intended to obtain, by casting, a magnet having planar axially opposite end faces, the central zone of each end face tends to be raised than the laterally opposite end zones of the end face due to deformation caused by stress produced when crystals are formed. Accordingly, if a magnet having such a shape is placed on the annular shoulder 1c of the casing 1, the magnet will be inclined relative to the axis of the casing with a result that the magnet will be slightly moved when the magnet retainer member 5 is urged into the circle of four such magnets. If the case be such, therefore, the force exerted by the magnet retainer member 5 to each magnet will not be evenly distributed in each magnet, so that stress is concentrated in a localized point of the magnet with a resultant occurrence of damage or brake of the magnet. This problem was taken into consideration in deciding the shape of the magnet 4 of the fifth embodiment shown in FIGS. 12–14.

In the described embodiments of the invention, sufficiently strong force is provided to secure and hold the component parts in position without the use of any adhesive, but it will be apparent to those in the art that an adhesive may be used as an auxiliary means to hold the component parts in position.

The fixing section 5b of the magnet retainer member 5 may alternatively be secured to the bottom wall 1b of the casing 1 by any securing means, such as spot welding or screws, other than deformed studs 1g employed in the described embodiments of the invention.

In the described and illustrated embodiments of the invention, the lower part of the cylindrical wall 5a of the magnet retainer member 5 is tapered to the lower end of the cylindrical section 5a. This, however, is not essential for the invention and the length of the tapered part may be one half the entire length of the cylindrical section 5a. Further alternatively, the cylindrical section 5a may be tapered throughout the entire axial length thereof. Moreover, it is not essential for the invention that the cylindrical section 5a has a smoothly tapered part. Namely, the tapered portion may have a concave, convex or axially stepped profile.

The magnet retainer member 5 may be formed from a thin sheet of magnetic material such as iron.

What is claimed is:

1. A magneto rotor including:
a generally cup-shaped casing having a perpheral wall open at one end and closed at the other end by an end wall;
a plurality of magnets disposed along an inner peripheral surface of said casing in mutually circumferentially spaced relationship with each other, said magnets being arranged to form a circumferentially discontinuous annulus having substantially cylindrical but circumferentially discontinuous inner peripheral surface having an open end communicated with and substantially coaxial with said open end of said casing, said annulus of magnets having a circumferentially discontinuous but generally annular axially outer end face adjacent to said open end of said casing; and
a magnet retainer member including a circumferentially continuous and substantially cylindrical section wedged into and extending in face-to-face pressure-contact with the inner peripheral surface of said annulus of magnets to urge them against the casing inner peripheral surface and a fixing section integral with the axially inner end of said cylindrical section and extending along and secured to said casing end wall, said magnet retainer member further including a flange section connected to the axially outer end of said cylindrical section and extending along said outer end face of said annulus of magnets in face-to-face engagement therewith to retain said magnets against axially outward removal from said casing, said magnet retainer member being formed from a thin sheet metal, said cylindrical section being provided thereon with radially outwardly deformed ridges radially aligned with and radially outwardly extending into the spaces between said magnets, respectively, the stress produced in said cylindrical section by being wedged into said annulus of magnets being concentrated in said radially outwardly deformed ridges, and said cylindrical section including an axially inner portion adjacent to said fixing section, said portion being substantially gradually reduced diametrically from the inner diameter of said annulus of magnets and converging to the axially inner end of said cylindrical section.

2. A rotor according to claim 1, wherein each of said magnets has axially opposite end faces each having a circumferentially central zone axially depressed and offset from the circumferentially opposite end zones of the magnet end face.

3. A rotor according to claim 1, wherein said flange section is generally annular and extends along the outer end of said cylindrical section of said magnet retainer member.

4. A rotor according to claim 3, wherein notches are formed in said flange section and extend radially inwardly from the outer peripheral edge of said flange section, said notches being substantially radially aligned with said radially outwardly projecting ridges of said magnet retainer member and thus the spaces between said magnets, respectively.

5. A rotor according to claim 3, wherein said flange section is formed therein with circumferentially elongated slots substantially radially aligned with said radially projecting ridges of said magnet retainer member and thus with the spaces between said magnets, respectively.

6. A rotor according to claim 5, wherein said flange section is formed therein with recesses adjacent to the radially outer sides of said slots, respectively.

7. A rotor according to claim 1, wherein said end wall of said casing is formed therein with a first set of centering holes and said fixing section of said magnet retainer member is also formed therein with a second set of centering holes, said first and second sets of centering holes being aligned axially of said rotor and prepared for the purpose of receiving centering pins of a jig to be used when said casing and said magnet retainer member are assembled together.

8. A rotor according to claim 7, wherein said fixing section of said magnet retainer member is formed therein with a third set of through-holes, said rotor further including means extending through said third set of throughholes to secure said fixing section of said magnet retainer member to said casing end wall.

9. A rotor according to claim 1, wherein said fixing section of said magnet retainer member is generally annular and extends along the end of said reduced portion adjacent to said casing bottom wall, and wherein notches are formed in said annular fixing section and extend radially outwardly from the inner peripheral edge of said fixing section, said notches being substantially radially aligned respectively with the spaces between said magnets.

10. A rotor according to claim 1, wherein said casing further includes integral and radially inward projections disposed respectively in the spaces between said magnets.

11. A rotor according to claim 1, wherein said magnet retainer member further includes an annular rib having a substantially arcuate section as viewed in the axial section of said magnet retainer member, and wherein said annular rib is disposed between and interconnects the axially outer end of said cylindrical section and said flange section.

12. A rotor according to claim 1, wherein said casing further includes an annular shoulder disposed adjacent to said end wall and wherein said magnets have axially inner ends disposed in contact with said annular shoulder.

13. A rotor according to claim 1, wherein each of said magnets has lateral edges defined between the radially inner face of the magnet and the axially opposite end faces thereof, said edges being bevelled.

14. A rotor according to claim 1, wherein the inner peripheral surface of said casing includes a portion adjacent to the axially outer end thereof, said portion of said casing inner peripheral surface being tapered to diverge outwardly to the axially outer end of said casing, and wherein each of said magnets has a radially outer surface having an axially outer portion cooperating with said axially outwardly diverged portion of said casing inner peripheral surface to define a small gap therebetween.

15. A rotor according to claim 13, wherein each of said magnets has radially outer lateral edges defined between the radially outer surface of the magnet and the axially opposite end faces thereof, said radially outer lateral edges being bevelled.

* * * * *